April 3, 1956 C. M. BLANCHARD 2,740,308
DOWELLING DEVICE
Filed March 27, 1953 2 Sheets-Sheet 1
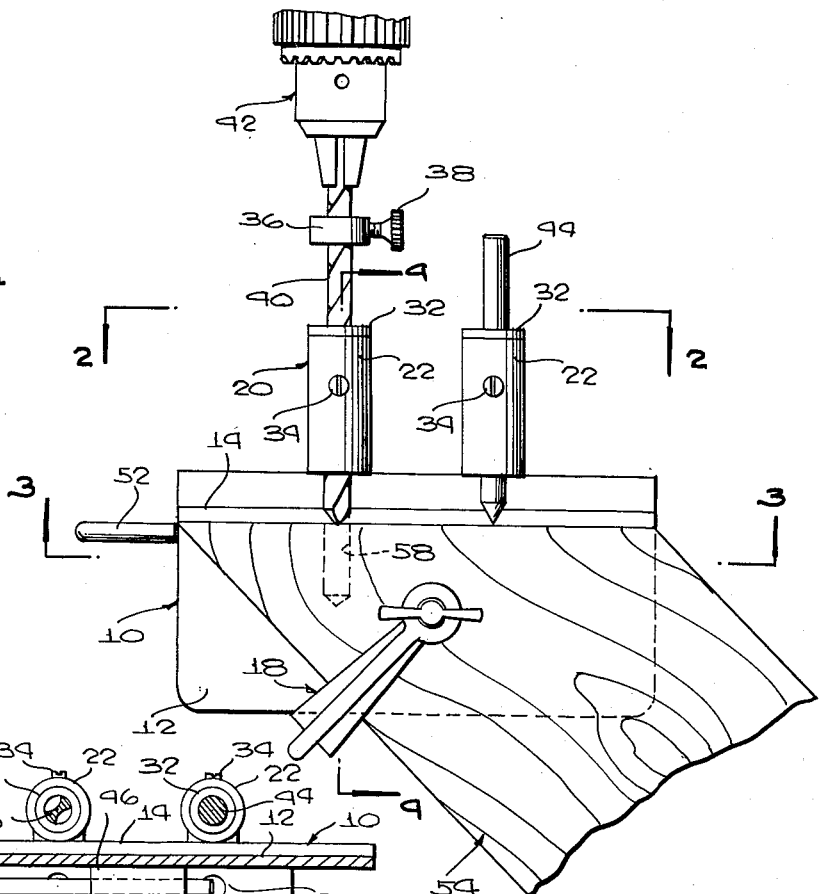
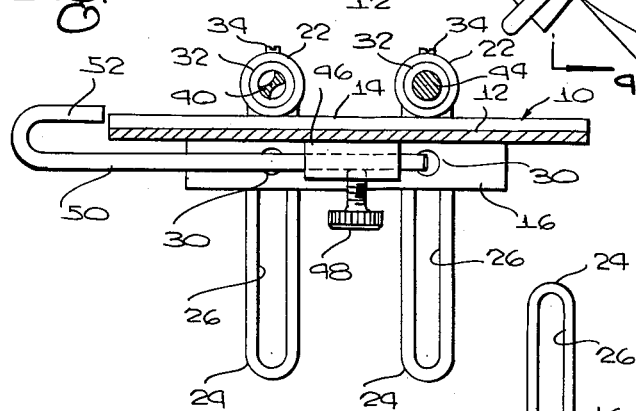
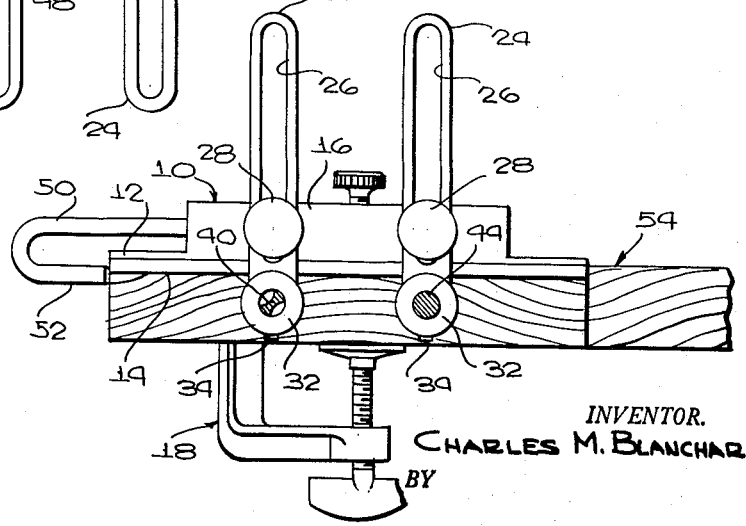
INVENTOR.
CHARLES M. BLANCHARD
BY
McMorrow, Berman + Davidson
ATTORNEYS April 3, 1956   C. M. BLANCHARD   2,740,308
DOWELLING DEVICE
Filed March 27, 1953   2 Sheets-Sheet 2
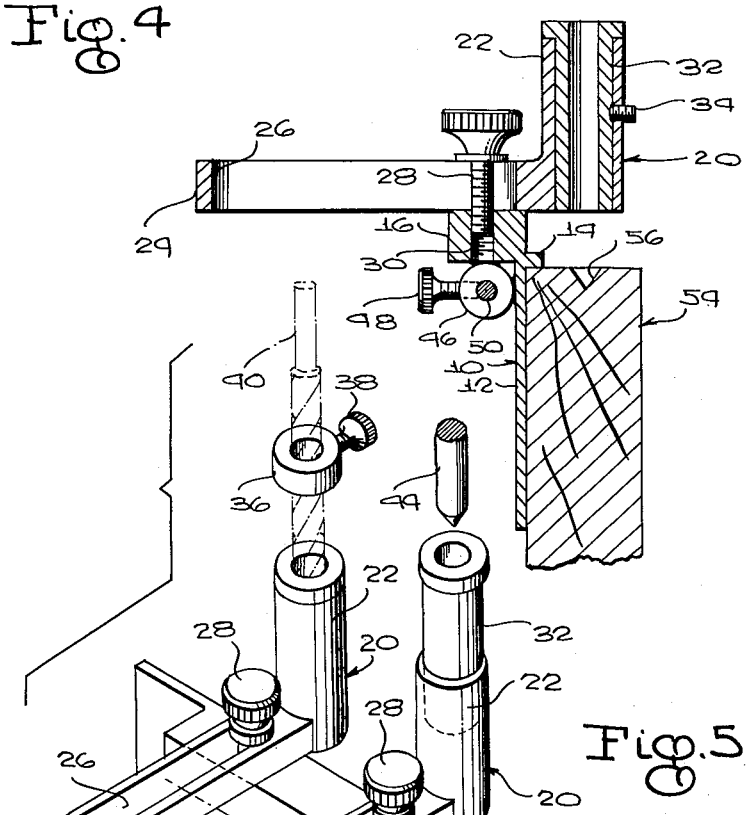
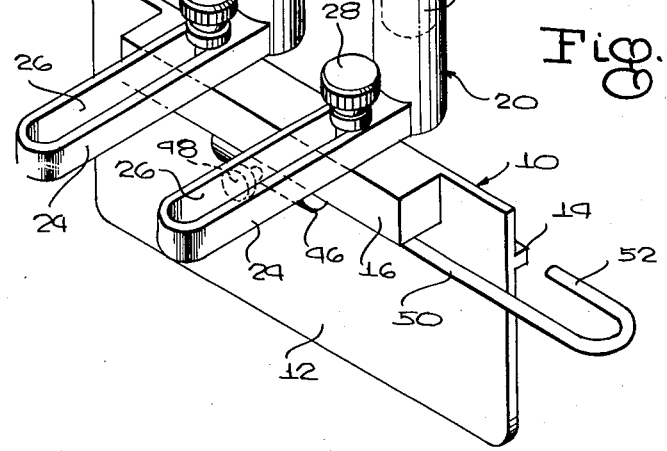
INVENTOR.
CHARLES M. BLANCHARD
BY
McMorrow, Berman + Davidson
ATTORNEYS United States Patent Office 2,740,308
Patented Apr. 3, 1956

2,740,308

DOWELLING DEVICE

Charles M. Blanchard, Rock Island, Ill.

Application March 27, 1953, Serial No. 344,976

3 Claims. (Cl. 77—62)

This invention relates to a device attachable to a work piece such as a length of wood stock, for guiding dowelling bits during the drilling of dowel-receiving recesses in the work piece.

An important object of the present invention is to provide a portable dowelling device or machine of the type stated, which will be so designed as to be particularly well adapted for use by the home craftsman, the invention being novelly formed, in this connection, in a manner that will permit the same to be manufactured at a very low cost, considering the benefits to be derived from the use thereof.

It is well appreciated, in this regard, that dowelling machines, for use by carpenters and other professional craftsmen, are in widespread use today, but in all instances of which I have knowledge, said machines are so designed as to make their purchase by a home craftsman prohibitive.

A further object of importance is to provide a device as stated which, despite its small size and low cost, will still insure the drilling of accurately spaced dowel-receiving recesses in a work piece.

Another object is to provide a device as stated which will permit the drilling of dowel recesses of different diameters.

Another object is to provide a dowelling device, the versatility of which will not be reduced in any way by the particular dimensions of the work piece, or by the selection of the work piece surface in which the recesses are to be formed.

A further object of importance is to provide a device as stated which will include spaced dowel heads each of which is adapted to receive either a dowelling bit or a pointed pilot pin, said heads being so mounted as to be adjustable independently of one another to any of various positions, whereby to preset, within a wide range of adjustments, the spacing of the dowel recesses, while at the same time permitting said heads to be properly adjusted for location of the dowel recesses medially between opposite surfaces of the work piece.

Yet another object is to provide, in a dowelling device, of the character referred to, a starting gauge which can be used for locating the first recess to be drilled, said starting gauge being subsequently usable, after recesses have been drilled in one work piece, for properly locating the points at which dowel recesses are to be formed in a complementary work piece.

Still another object is to provide, in a dowelling device as stated, means attachable to a dowelling bit for adjustably limiting the depth to which said bit will penetrate the work piece.

Other objects will appear from the following description, the claims appended thereto, and from the annexed drawings, in which like reference characters designate like parts throughout the several views, and wherein:

Figure 1 is a side elevational view of a dowelling device formed in accordance with the present invention, a work piece on which the device is mounted being illustrated fragmentarily and in side elevation, and a portable drill used in association with said device, said drill also being shown fragmentarily and in side elevation;

Figure 2 is a plan section on line 2—2 of Figure 1;

Figure 3 is a sectional view taken substantially on line 3—3 of Figure 1;

Figure 4 is a transverse sectional view, taken on line 4—4 of Figure 1; and

Figure 5 is a partially exploded perspective view of the dowelling device per se, a dowelling bit being illustrated in dotted outline.

The dowelling device constituting the present invention includes a frame designated generally by the reference numeral 10. The frame can be formed from a single piece of material, and includes a plate 12 having a flat plane face 12' which, as shown in Figure 4, is engageable against one surface of a work piece. Carried by the plate 12 and extending outwardly from the face 12' intermediate opposite side edges thereof is a rib 14, one face 14' of which lies perpendicular to the face 12' to define a stop for engagement with the surface of the work adjacent that engaging the face 12' of the plate 12.

Carried by the plate 12 and extending outwardly from the side thereof remote from the rib 14 is a flange 16 carrying a flat face 16' which lies flush with the adjacent side edge of the plate 12 and parallel to the face 14' of the rib 14. Extending through the flange 16 are spaced parallel internally screw threaded openings 30, the axes of which lie perpendicular to the face 16' of the flange 16 and threadedly engaging said openings 30 are clamping screws 28, the purpose of which will hereinafter appear.

The frame 10 constituting plate 12, guide flange 14, and block 16 is engageable against a work piece, and is adapted to be fixedly attached to said work piece, in selected positions, by means of a conventional C-clamp 18.

Mounted on the face 16' of the flange 16 are spaced dowelling heads designated generally 20 which are of identical form and are supported for adjustment on the flange 16 by the clamping screws 28.

Each doweling head 20 includes a guide sleeve 22 having an axial bore 22' extending therethrough and carried by said guide sleeve 22 and extending laterally outwardly therefrom adjacent one end thereof is a support arm 24 having a longitudinal slot 26 extending therethrough. The side 24' of the support arm 24 lies in a plane flush with the end of the sleeve 22 and perpendicular to the axis of the bore 22'.

In assembling the device for use, the clamping screws 28 are disengaged from the threaded openings 30 and extended through the slots 26 in the support arms 24 and reentered into the threaded openings 30 to clampingly engage the support arms 24 with the flange 16, with the plane faces 16' and 24' in contact. By tightening the clamping screws 28, it is obvious that the dowelling heads 20 may be supported in selected positions above work engaging the face 14' of the rib 14.

As will be appreciated, there is thus provided a slidable and pivotal connection of each arm 24 to block 16, so that each head 20 is adjustable relative to the frame, independently of the other head.

When each head has been adjusted to a selected position relative to the frame 10 and the work piece, it will be fixed in the selected position of adjustment, by turning the clamping screw 28 home, into binding engagement with the associated support arm 24.

Removably positioned in each guide sleeve 22 is a tubular adapter or drill bit guide bushing 32, formed open at its opposite ends, each adapter 32 having, at one end, a circumferential shoulder engageable against the adjacent end of the guide sleeve. A set screw 34, threadably engaged in the guide sleeve 22, is adapted to bind against the adapter, so as to secure the adapter fixedly within the guide sleeve.

The invention includes means for limiting penetration of a dowelling bit within the work piece, and to this end, the dowelling bit may be fitted with a depth control collar 36. The collar 36 includes a set screw 38, and as will be seen from Figure 5 and from Figure 1, the collar is adapted to receive a dowelling bit 40, the collar being adjustable longitudinally of said dowelling bit and being clamped to the bit in selected positions of longitudinal adjustment.

Thus, when the dowelling bit is extended through the sleeve 22, movement of the bit inwardly of the work piece will be limited by the collar 36 circumposed thereabout, said collar ultimately engaging against the upper end of the guide sleeve or against the adapter 32, as the case may be.

The dowelling bit 40 is of a conventional type, and does not, per se, constitute part of the present invention. As will be seen from Figure 1, the dowelling bit is adapted to be engaged in the chuck of a conventional, portable electric drill 42.

From the description which has so far been provided, it will be seen that after the frame 10 has been clamped to the work piece, the clamping screws 28 can be left loose, until the guide sleeves 22 have been properly adjusted relative to one another and to the work piece. By combination of slidable and pivotal adjustments of the support arms 24 upon their associated screws 28, the sleeves 22 can be disposed selected distances apart, the distance the sleeves are spaced apart depending upon the desired spacing of the dowel-receiving recesses to be formed. Further, the slidable mounting of the respective support arms 24 permits said sleeves 22 to be adjusted laterally of the frame, so as to insure the location of the dowel recesses at a point medially between opposite surfaces of the work piece. It will be readily appreciated, in this regard, that a wide range of adjustments can be made, and said adjustments will not be limited in any way by the particular dimensions of the work piece.

It will further be observed, from the description which has so far been provided, that a set of adapters or drill bit guide bushings 32 can be provided with each device, the adapters of said set having bores of different diameters, to accommodate dowelling bits of correspondingly different diameters. Thus, the device permits dowel-receiving recesses of selected diameters to be formed in the work piece.

A pilot pin has been designated by the reference numeral 44, and is insertable in a selected adapter 32, after the heads 20 have been properly adjusted preliminary to drilling of the recesses. As an initial step, the pilot pin is extended downwardly so as to project below the lower end of each sleeve 22, after which said pin can be struck forcibly for the purpose of forming a pilot recess in the work piece. The pilot pin is then removed, and the dowelling bit is extended through the adapter, the tip of the dowelling bit being extendable into the pilot recess and being thereafter rotated through the medium of the drill 42 for the purpose of forming a dowel recess of selected depth.

Means is included in the invention for properly locating the device prior to drilling of the first recess in a selected work piece. To this end, a tubular gauge rod support member 46 is made rigid with the frame 10, said member underlying and being arranged longitudinally of the block 16. The tubular member 46 is formed open at its opposite ends, and is provided, intermediate its ends, with a clamp screw 48. The clamp screw 48 is threadable in a threaded transverse opening of the tubular member 46, said transverse opening communicating with the axial bore of the tubular member.

A gauge rod 52 is slidable and rotatable in the axial bore of the tubular member 46, and as will be noted from Figure 5, has one end projecting beyond one end of the frame 10. The projecting end of the rod 50 is integrally formed with a reversely bent, hook-like extension 52, which extension 52 is adapted to engage an adjacent surface of the work piece, in the manner shown in Figures 1 and 2.

Engagement of the hook-like extension 52 against the work piece is effective to properly locate the frame 10 relative to said work piece. As a result, after dowel recesses have been started in said work piece, the gauge rod 50 can be shifted out of engagement with the work piece. Subsequently, when complementary dowel-receiving recesses are to be formed in another work piece, the same setting of the gauge rod can be employed, to locate the frame 10 properly once again.

This results in properly aligning the dowel-receiving recesses of a pair of complementary work pieces, so that said work pieces will interfit properly with opposed dowel recesses in proper alignment to receive suitable dowels, not shown.

The work piece, in the illustrated example of the invention has been designated by the reference numeral 54, and of course does not constitute part of the present invention. The work piece 54, after the frame has been properly located relative thereto and has been clamped in position, will have that surface thereof in which the dowel recesses are to be formed in position below the guide sleeves 22. The pilot pin 44 can then be extended through each of the guide sleeves in turn, for forming pilot recesses 56. The pilot pin is then removed, and the dowelling bit 40 is extended through each guide sleeve in turn, and is rotated by the drill 42 for the purpose of forming dowel recesses 58.

It is believed to be an important characteristic of the invention that it is capable of manufacture at a minimum of cost, considering the benefits to be obtained from the use thereof. Thus, the device is well adapted for use by a home craftsman, and is so designed as to permit the accurate spacing of recesses 58 formed in the work. At the same time, the recesses will be drilled to a proper depth, by proper adjustment of the depth control collar 36 longitudinally of its associated bit 40.

Further, after recesses have been formed in one piece of work, the starting gauge 50 will insure proper locating of opposed recesses in a complementary work piece.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A drill jig for locating dowel holes in a work piece, said jig comprising a plate adapted to engage one face of a work piece, a rib carried by and extending outwardly from the plate intermediate opposite side edges thereof to define a stop for engaging a face of the work piece adjacent that engaged by the plate, a flange and extending outwardly therefrom adjacent one side edge thereof on the side of the plate remote from the rib, a pair of drill guiding sleeves carried by the flange for movement in adjacent horizontal paths to selected positions above the face of the work piece engaged by the rib, a gage carried by the plate adjacent its junction with the flange for movement to selected positions adjacent one end of the plate for engaging the work and cooperating with the plate and flange in locating the sleeves relative to the work, and drill bit guide bushings removably mounted in the sleeves.

2. A drill jig for locating dowel holes in a work piece, said jig comprising a plate adapted to engage one face of a work piece, a rib carried by and extending outwardly from the plate intermediate opposite side edges thereof for engaging a face of the work piece adjacent that engaged by the plate, a flange extending outwardly therefrom adjacent one side edge of the plate on the side thereof remote from the rib, a pair of drill guiding sleeves carried by the flange for movement in adjacent horizontal paths to selected positions above the face of the work piece engaged by the rib, a guide barrel carried by the plate adjacent the edge thereof carrying the flange, a gage rod mounted in the barrel to move to selected positions in a rectilinear path adjacent the side of the plate remote from the flange, and a work engaging stop carried by the gage rod for contacting a portion of the work lying adjacent the above-mentioned faces.

3. A drill jig for locating dowel holes in a work piece, said jig comprising a plate adapted to engage one face of a work piece, a rib carried by and extending outwardly from the plate adjacent intermediate opposite side edges thereof for engaging a face of the work piece adjacent that engaged by the plate, a flange carried by the plate and extending outwardly therefrom adjacent one edge and on the side thereof remote from the rib, said flange having longitudinally spaced parallel internally screw threaded openings extending therethrough in parallel relation to the plate, thumb screws threadedly engaged in the openings, arms mounted on the flange and having slots extending therethrough for receiving the thumb screws, drill guiding sleeves carried by the arms for movement in adjacent horizontal paths to selected positions above the face of the work piece engaged by the flange, and drill bit guide bushings removably mounted in the sleeves.

References Cited in the file of this patent

UNITED STATES PATENTS

| | | |
|---|---|---|
| 310,710 | Nichols | Jan. 13, 1885 |
| 809,069 | Lovett | Jan. 2, 1906 |
| 971,627 | Nicholls | Oct. 4, 1910 |
| 1,093,029 | Bowen | Apr. 14, 1914 |
| 2,519,468 | Hengst | Aug. 22, 1950 |